H. E. WILLSIE.
ICE MACHINE.
APPLICATION FILED MAR. 11, 1920.
Reissued June 15, 1920. 14,885.
Fig-2-
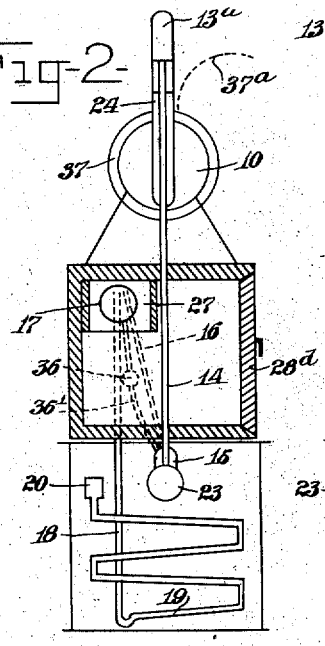
Fig-1-
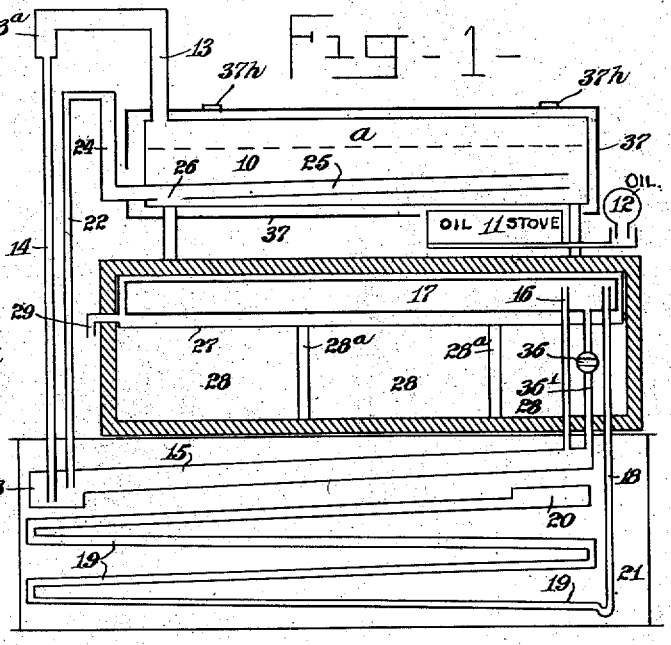
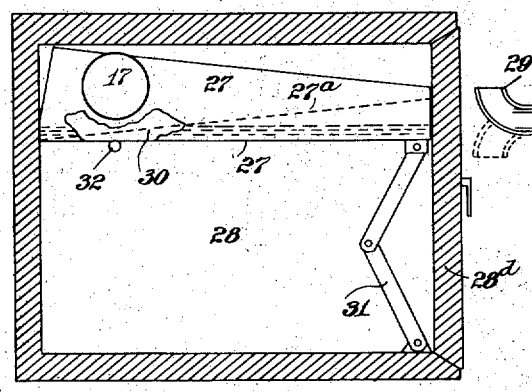
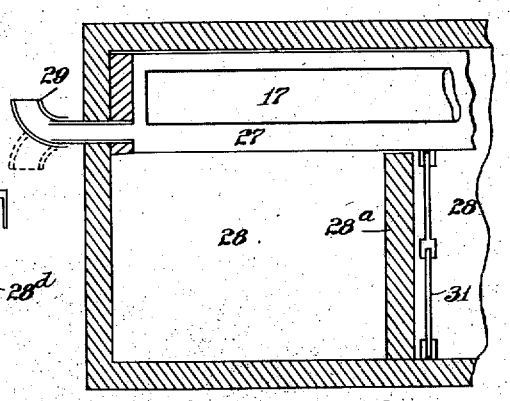
Fig-4-
Fig-3-
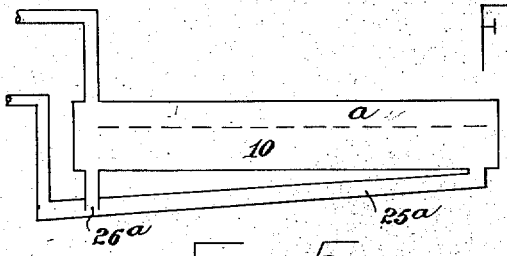
Fig-5-
INVENTOR
H. E. Willsie
BY
Mitchell & Ely
ATTORNEYS

UNITED STATES PATENT OFFICE.

HENRY E. WILLSIE, OF DARIEN, CONNECTICUT, ASSIGNOR TO THE AMERICAN REFRIGERATION COMPANY, A CORPORATION OF NEW JERSEY.

ICE-MACHINE.

14,885. Specification of Reissued Letters Patent. Reissued June 15, 1920.

Original No. 1,290,455, dated January 7, 1919, Serial No. 823,066, filed March 7, 1914. Application for reissue filed March 11, 1920. Serial No. 365,040.

*To all whom it may concern:*

Be it known that I, HENRY E. WILLSIE, a citizen of the United States, and a resident of Darien, Connecticut, formerly of Cranford, in the county of Union and State of New Jersey, have invented certain new and useful Improvements in Ice-Machines, of which the following is a specification.

The object of my invention is to produce an ice making and refrigerating apparatus suitable for domestic use, and to this end I have made my invention so simple to operate that no especial skill or knowledge of refrigeration machinery is necessary to use it successfully. Another object of my invention is to eliminate the parts, usually found in apparatus of this general type, which are liable to get out of order and to use devices of great certainty of action. Another object is to provide means for draining into the still-absorber when it is at a higher level than the evaporator. Another object is to air insulate the evaporator during the heating period.

I attain these objects by the mechanism such as shown in the accompanying drawing, in which, Figure 1 is a diagrammatic side elevation and partial section of the machine; Fig. 2, an end elevation, partly sectional, of the same; Fig. 3, a vertical section through the ice water drain and a portion of the refrigerator; Fig. 4, a vertical cross section through the refrigerator and ice pan; and Fig. 5, a vertical diagram of a modification of the still-absorber.

Similar characters refer to similar parts.

The operation of my machine is as follows: A still-absorber, 10, filled with aqua ammonia to about the level of the dotted line *a*, is heated for instance by a blue flame oil stove, 11, thus driving ammonia gas through the pipes 13, 14, 15, 16, the evaporator, 17, the pipe 18, into the condensing coil 19, where the gas is liquefied. The rectifier 15 and the coil 19 are submerged in cooling water contained in the tank 21. When the fuel in the reservoir 12 burns out, allowing the still-absorber to cool and its pressure to decrease the liquid ammonia in the coil 19 is forced up pipe 18 into the evaporator 17.

Whatever moisture the rectifier pipe 15 has caught has collected in the trap 23 about the lower open ends of the pipes 14 and 22 which open into the trap at a low level. The returning gas forms columns of liquid in both pipes, 14, 22, and pipe 22 being shorter than pipe 14 all excess of liquid, not in pipe 14 and in the bottom of the trap, is forced up pipe 22 into the still-absorber. A pocket $13^a$ may be provided as additional precaution against return flow. The pipe 22 having been emptied of liquid and a column of liquid still remaining in pipe 14, the returning gas flows through pipes 22 and 24 into the circulating pipe 25 where the gas is absorbed, by weak liquor entering through the opening 26 and passing up pipe 25 in the lower part of the tank 10.

The ice pan 27, having been filled with water, or brine, to a level above the bottom of the evaporator 17, a mass of ice is frozen about the evaporator and the water in the pan chilled to a refrigerating temperature. The bottom of the sheet metal pan 27 forms the top of the food chambers 28, 28. Thus the food chambers are chilled by heat passing through the sheet metal bottom into the chilled water or ice. When the machine is again started by lighting the stove 11, the elbow 29 is turned down so as to drain water out of the pan 27 to a level below the bottom of the evaporator, thus surrounding the evaporator with an air space. The ice, 30, falls away from the evaporator and continues to chill the water in the pan 27 while the warm gas is passing through into the condenser. For refilling the pan 27 water is poured into the upturned elbow 29. Instead of removing the water from the pan 27 the whole pan may be lowered. Or the pan may be pivoted at 32 and tilted up by the toggle joints 31, 31, during the freezing period, so that the pan bottom is in the position shown by dotted line $27^a$, thus flowing water about the evaporator. During the heating period, the pan 27 is leveled, as shown in Fig. 4, lowering the ice and water, or brine, away from the evaporator.

The refrigerator is divided into compartments 28 by the partitions $28^a$, $28^a$, and also has doors, as $28^d$.

The condensing coil has but one opening, at the bottom, and the capacity of the coil may be increased by an enlargement or tank, 20, connected to its upper end, but such enlargement is substantially a part of the coil. This arrangement increases the efficiency of the coil.

The valve 36 in pipe 36′ may be opened to drain water from the evaporator into the trap 23. The casing 37 about the still-absorber 10 is provided with a door $37^a$, hinged at $37^b$, $37^b$, which may be opened to cool the still-absorber. In Fig. 5 the function of the pipe $25^a$ is similar to that of pipe 25, and the opening $26^a$ acts as does the opening 26. The tank 10 is referred to in some of the claims as a still-absorber, and in some of the claims as a generator absorber. The pipe 15 is referred to in some of the claims as a rectifier. The evaporator 17 is referred to in some of the claims as a refrigerating member. The coil 19 is referred to in some of the claims as a condensing member.

What I claim and desire to secure by Letters Patent, is:

1. In an ice machine, a condenser, an evaporator located above said condenser and connected therewith through a single pipe, a still-absorber located above said evaporator and adapted to contain a liquid, a trap located below said evaporator and connected therewith so that liquid may flow from said evaporator to said trap, and two pipes leading from said trap to said still-absorber, one discharging above and the other below the surface of liquid in said still-absorber.

2. In an ice making machine, a condenser, an evaporator located above said condenser and connected therewith through a single pipe, a still-absorber located above said evaporator and adapted to contain a liquid, a trap located below said evaporator and connected therewith so that liquid may flow from said evaporator to said trap, two pipes leading from said trap and discharging one above and the other below the surface of the liquid in said still-absorber, and means whereby gas flowing from said still-absorber is made to flow through said first mentioned pipe and gas returning to said still-absorber is made to flow through said second mentioned pipe.

3. In an ice making machine, the combination of a condenser, an evaporator, a still-absorber at a higher level than the evaporator, all connected in an operative cycle, a trap in the connection between the evaporator and the still-absorber, and a pipe connecting the trap with the still-absorber.

4. In an ice making machine, the combination of a condenser, an evaporator connected to the condenser, a still-absorber at a higher level than the evaporator; a trap connected to the evaporator, means for draining the evaporator into the trap, and a pipe connecting the bottom of the trap with the still-absorber.

5. In an ice making machine, the combination of a condenser, an evaporator connected to the condenser, a still-absorber at a higher level than the evaporator, a trap connected to the evaporator, a pipe connecting the bottom of the trap with the top of the still-absorber, and a pipe connecting the trap with the bottom of the still-absorber.

6. In an ice making machine the combination of a still-absorber, an evaporator connected to the still-absorber, a coil closed at the top, a pipe connecting the bottom of the coil with the evaporator.

7. In an ice making machine, the combination of a tank for cooling water, a condenser closed at its top and located within said tank, an evaporator connected with the bottom of said condenser, a still-absorber, a rectifier connected with the evaporator and with the still-absorber, and means for draining the rectifier into the still-absorber.

8. In an ice making machine, the combination of a tank for cooling water, a coil closed at the top within said tank, an evaporator connected to the bottom of the coil, a still-absorber, a rectifier within said tank connected to the evaporator and to the still-absorber, and means for draining the rectifier into the still-absorber.

9. In an ice making machine, the combination of a tank for cooling water, a coil closed at the top within said tank, an evaporator connected to the bottom of the coil, a still-absorber at a higher level than the evaporator, a rectifier at a lower level than the evaporator and connected to the evaporator and to the still-absorber, and means for draining the rectifier into the still-absorber.

10. In refrigerating apparatus of the absorption type, the combination of a generator-absorber, a refrigerating member, a condensing member below said refrigerating member, communicating means between said generator-absorber and refrigerating member and communicating means between said condenser and refrigerating member.

11. In refrigerating apparatus of the absorption type, the combination of a generator-absorber, a refrigerating member, a condensing member below said refrigerating member, communicating means between said generator-absorber and refrigerating member and communicating means between said condenser and refrigerating member, said last mentioned communicating means having its discharge and intake end terminating near the bottom of said condensing member.

12. In refrigerating apparatus of the absorption type, the combination of a generator-absorber, a refrigerating member, a condensing member below said refrigerating member, communicating means between said generator-absorber and refrigerating member and communicating means between said condenser and refrigerating member, said last mentioned communicating means being independent of the communicating means between said generator-absorber and refrigerating member whereby the refrigerant is caused to pass from the generator-absorber to said refrigerating member and thence to the condensing member when the generator-absorber is heated and from the condensing member to the refrigerating member and back to the generator-absorber when said generator-absorber is cooled.

13. In refrigerating apparatus of the absorption type, the combination with a generator-absorber and a refrigerating member of a condensing chamber having a single common inlet and outlet located near the bottom thereof and in communication with said refrigerating member and communicating means between said refrigerating member and generator-absorber.

14. In an ice making machine, a still-absorber, an evaporator, a condenser, a pipe connecting the still absorber to the top of the evaporator, and a pipe connecting the top of the evaporator to the bottom of the condenser to form the operative connections between the still-absorber and the condenser.

15. In an ice machine, the combination of an evaporator, a tank adapted to contain cooling water, a condenser within said tank, a single pipe connecting with said condenser, and leading from the bottom thereof to the top of said evaporator, a still-absorber, a pipe connecting the top of said evaporator with said still-absorber and through which gas may flow from and return to said still-absorber, and means for heating said still-absorber.

16. In an ice making machine, the combination of a still-absorber, an evaporator, a condenser, a pipe connecting the bottom of the condenser with the top of the evaporator, and a pipe connecting the top of the evaporator with the still-absorber; the said pipe connections being adapted to conduct gas from the still-absorber through the evaporator to the condenser, and from the condenser through the evaporator and back to the still-absorber.

17. The combination of a still-absorber, a water cooled trap, a water cooled condenser, a connection between the upper part of the still-absorber and the lower part of the trap, a refrigerating member, a connection between the upper part of the refrigerating member and the upper part of the trap, a connection between an intermediate portion of said trap and the lower part of the still-absorber, and a connection between the upper part of the refrigerating member and the lower part of the condenser, said trap being below the still-absorber and the connection between the trap and the still-absorber having one leg which extends above the still-absorber.

18. The combination of a still-absorber, a trap connected to the upper and lower parts of the still-absorber, a refrigerating member, a connection between the upper part of said trap and the upper part of said refrigerating member, an independent drain connection between the upper part of said trap and the lower part of said refrigerating member, a condenser and a single pipe connection between the upper part of the refrigerating member and the lower part of said condenser.

19. The combination of a still-absorber, a refrigerator, a rectifier located below said still-absorber and connected to the upper and lower portions of the still-absorber, portions of said connection extending above the still-absorber, a condenser, a connection between said refrigerator and said condenser, and a connection between said refrigerator and said rectifier.

20. In an ice machine, the combination of a still-absorber, a condenser, an evaporator connected between the still-absorber and the condenser, said condenser having a single pipe communicating with one of its ends to the evaporator, through which pipe gas may flow to the condenser from the evaporator, and a liquid may flow from the condenser to the evaporator.

21. In an ice making machine, the combination of a still-absorber, an evaporator, and a condenser, connected together in an operative cycle by pipes in such a way that fluid passing from the still-absorber to the condenser and from the condenser to the still-absorber passes through the evaporator.

HENRY E. WILLSIE.